United States Patent
Armellin et al.

(10) Patent No.: US 6,311,747 B1
(45) Date of Patent: *Nov. 6, 2001

(54) HIGH-TRANSVERSE-CURVATURE TIRE, IN PARTICULAR FOR USE IN REAR WHEELS OF MOTOR-VEHICLES

(75) Inventors: Giancarlo Armellin, Nova Milanese (IT); Peter Kronthaler, München (DE)

(73) Assignee: Pirelli Coordinamento Pneumatici SpA, Milan (IT)

(*) Notice: Subject to any disclaimer, the term of this patent is extended or adjusted under 35 U.S.C. 154(b) by 0 days.

This patent is subject to a terminal disclaimer.

(21) Appl. No.: 08/899,213

(22) Filed: Jul. 23, 1997

(30) Foreign Application Priority Data

Jul. 29, 1996 (IT) ................................................ MI96A1613

(51) Int. Cl.$^7$ .............................. B60C 9/18; B60C 11/13; B60C 103/04; B60C 119/00
(52) U.S. Cl. ................................ 152/209.11; 152/209.18; 152/209.24; 152/454; 152/458; 152/526; 152/527; 152/531; 152/533; 152/536; 152/540; 152/903
(58) Field of Search .................... 152/209.11, 209.18, 152/209.24, 6, 903, 454, 456, 526, 527, 531, 533, 536, 540

(56) References Cited

U.S. PATENT DOCUMENTS 2,104,532 * 1/1938 Sommer ........................ 152/209.11 X
5,127,455   7/1992 Remick .
5,358,020 * 10/1994 Haas ............................... 152/209.11

FOREIGN PATENT DOCUMENTS 485778   5/1992 (EP) .
561326   9/1993 (EP) .
718122   6/1996 (EP) .
756949   2/1997 (EP) .

OTHER PUBLICATIONS

Patent Abstract of Japan, vol. 096, No. 006, Jun. 28, 1996 & JP 8–040020 A (Bridgestone Corp), Feb. 13, 1996.
Patent Abstract of Japan, vol. 010, No. 222, Aug. 2, 1986 & JP 61–060307 A (Sumitamo Rubler), Mar. 28, 1986.
Patent Abstracts of Japan, vol. 013, No. 514, Nov. 17, 1989 & JP 1–208205 A (Ohtsu Tire & Rubber) Aug. 22, 1989.

* cited by examiner

Primary Examiner—Adrienne C. Johnstone
(74) Attorney, Agent, or Firm—Stevens, Davis, Miller & Mosher, LLP

(57) ABSTRACT

A high-transverse-curvature tire (1), in particular for mounting onto the rear wheel of motor-vehicles, comprises a tread band (8), coaxially extended around a belt structure (6), wherein a plurality of rubber blocks (10), defined between a plurality of grooves (1 1) extending along a direction substantially transverse to the tire running direction (D), are formed which grooves comprise a bottom (12) connected to opposite inlet (13) and outlet (14) sidewalls. In an equatorial zone (E) of the tread band (8), the inlet wall (13) of the grooves (11) is inclined with respect to the bottom (12) of the same towards the tire rolling direction, and forms an angle ($\alpha$) of from 50° to 80° with respect to a plane ($\pi$) tangent to the bottom (12).

27 Claims, 3 Drawing Sheets

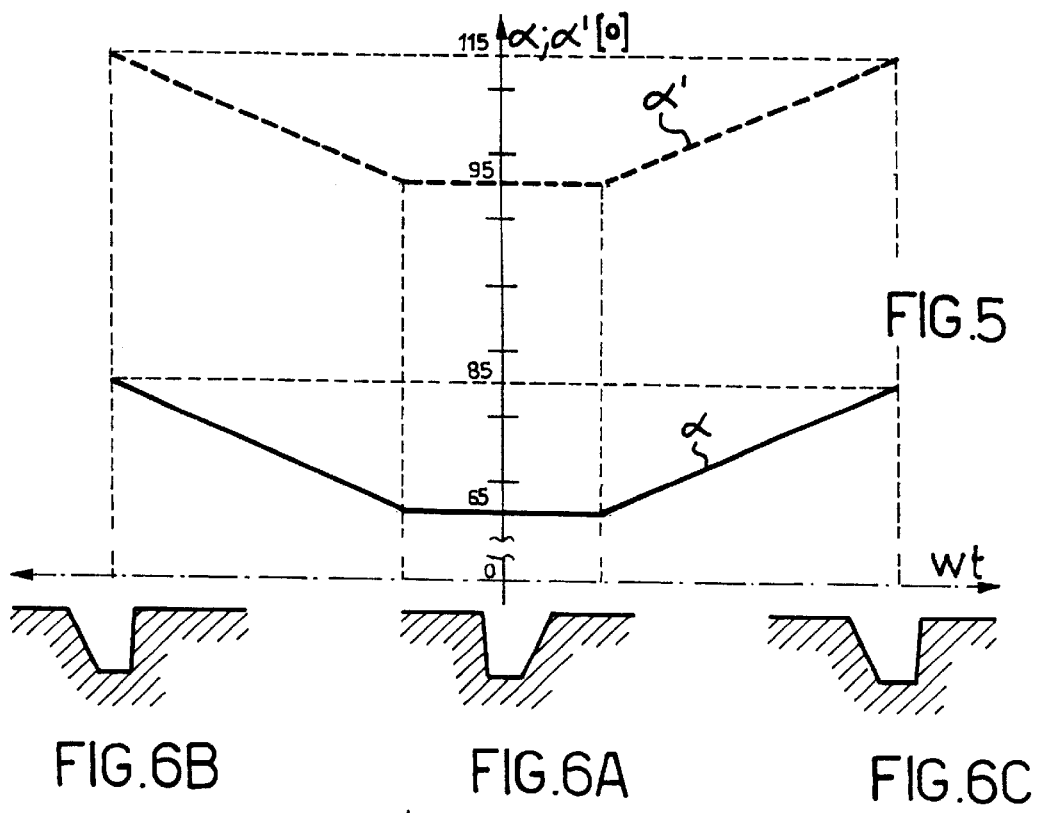
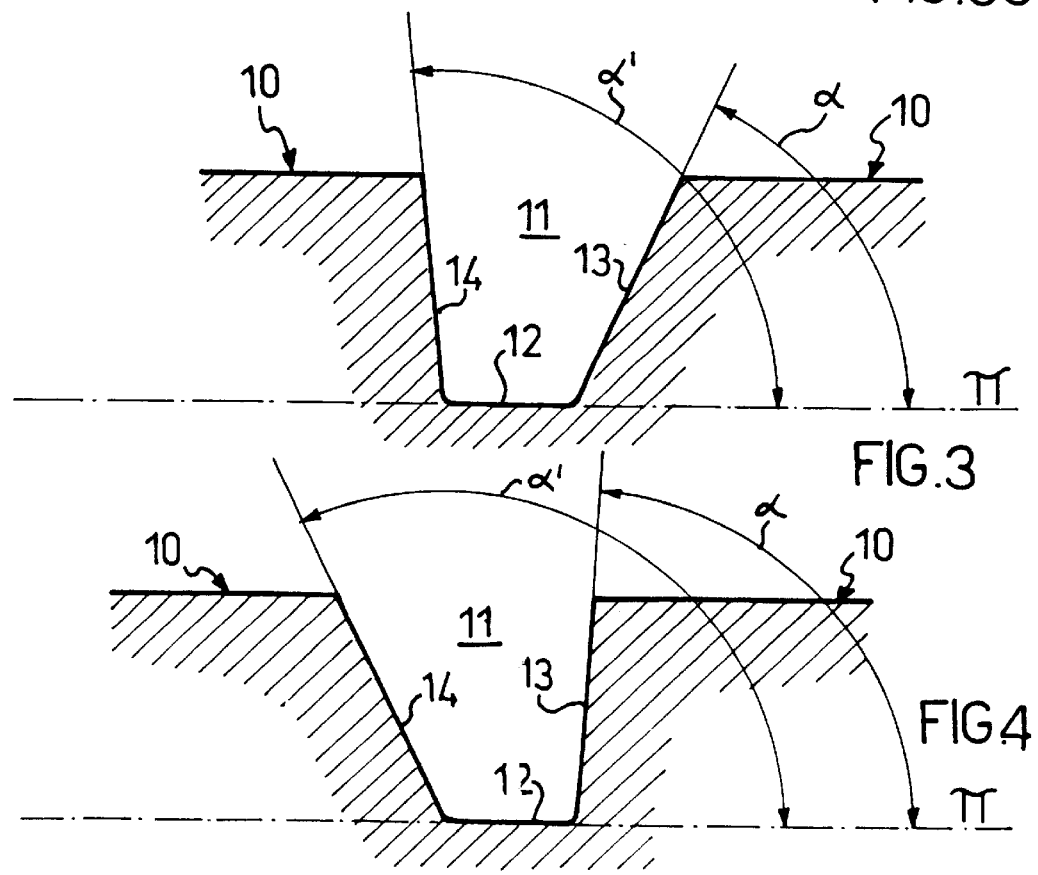

HIGH-TRANSVERSE-CURVATURE TIRE, IN PARTICULAR FOR USE IN REAR WHEELS OF MOTOR-VEHICLES

FIELD OF THE INVENTION

The present invention relates to a high-transverse-curvature tire, in particular for use in motor-vehicles, comprising:

a carcass structure of toric form having a high transverse curvature and provided with a central crown portion and two sidewalls ending in a couple of beads for anchoring onto a corresponding mounting rim;

a belt structure, circumferentially inextensible, coaxially extended around the carcass structure;

a tread band coaxially extended around the belt carcass and comprising a plurality of rubber blocks defined between a plurality of grooves extending along a direction substantially transverse to the running direction of the tire, the tread band being, free from any groove extending along a direction substantially parallel to the running direction of the tire, said grooves comprising a bottom connected to opposite inlet and outlet lateral walls, extending substantially perpendicularly to said bottom.

In the following description and in the appended claims, the expression: "lateral walls substantially perpendicular to the groove bottom", is intended to indicate walls so shaped as to form—with respect to a plane perpendicular to the bottom—an angle varying from 0° to 40°.

More particularly, the invention relates to a rear tire for two-wheeled motor-vehicles, wherein the transverse curvature value—as defined by the ratio between the height of the tread crown from a line passing through the tread axial ends, said line being measured at the equatorial plane or "camber" of the tread band, on the one hand, and the distance between said tread ends on the other hand is not lower than 0.15.

In the following description and in the appended claims, said ratio will be indicated by the term: "curvature ratio".

BACKGROUND OF THE INVENTION

As is known, tires for two-wheeled vehicles have been manufactured for a long time with a carcass structure comprising a couple of plies of rubberized fabric reinforced with cords symmetrically inclined with respect to the tire equatorial plane, which structure is usually known as cross-plies carcass, and possibly a belt structure also comprising couples of strips of rubberized fabric provided with cords inclined with respect to the tire equatorial plane.

While such tire structure could ensure an extremely regular curve holding of the motor-vehicle, the use of this type of tires involved problems of comfort, stability, road holding of the vehicle and weariness of the driver, due to their excessive stiffness.

The structure of these tires, in fact, accumulated—under the effect of an imposed deformation—elastic energy which was given back almost instantaneously upon termination of the stress, amplifing the unevennesses transmitted by the road surface layer, with ensuing stability loss of the vehicle.

To try to obviate these problems, the use of radial carcass tires with a belt structure of textile or metal cords has been recently introduced: in particular, the rear tire is provided with a belt structure comprising, sometimes exclusively, a winding of circumferentially-oriented cords, preferably metal cords, also indicated by the term: zero-degree cords.

This belt structure of the tires has unquestionably improved the situation in terms of comfort and driving stability: since the rear tire has a remarkable dampening effect, in fact, the vehicle oscillations at straightaway high speeds have in practice disappeared.

However, regardless of which belt structure type is adopted for the tires, no adequate solution has been found so far in connection with the problem of an extremely irregular and dishomogeneous wear of the edges of the grooves defining the rubber blocks formed in the tire tread, often associated with removal of bulk portions of rubber referred to in the art by the term: "chunking".

The causes of such phenomenon, particularly marked in case of tires to be mounted on the rear wheel of a motor-vehicle, are in general ascribed both to the rubbing effect of the groove edges with the road, and to the excessive mobility of the rubber blocks positioned upstream of the inlet edges of the grooves towards the rolling direction of the tire.

In this regard, it has been found that such excessive mobility causes a local overheating of the rubber composition of the tire tread, due to a high energy dissipation by hysteresis, which overheating causes in its turn a degradation of the rubber composition, facilitating the aforesaid chunking phenomenon.

SUMMARY OF THE INVENTION

In the light of the lack in the art of any suggestion for remedying to such phenomenon, the Applicant has now realized that the problem now identified can be overcome by a tread band having:

a relatively low mobility of the rubber blocks positioned upstream of the grooves located in the central part or equatorial zone of the tire, stressed during the prevailing running of the vehicle (straight road), and a relatively higher mobility of the rubber blocks located in opposite side portions of the tire tread, so as to ensure while travelling over a curvilinear path the energy dissipation by hysteresis necessary to obtain an adequate grip between tire and road.

Therefore, the invention provides a tire for two-wheeled vehicles of the type mentioned hereinabove, which is characterized in that in an equatorial zone of the tread band the inlet wall of said grooves is inclined with respect to said bottom towards the rolling direction of the tire and forms with respect to a plane tangent to said bottom an angle ($\alpha$) of from 50° to 80°.

In the following description and in the appended claims, the terms: "inlet" and "outlet" are intended to indicate—with reference to the structural characteristics of the grooves—those parts of the grooves which are stressed first or get in touch first with the ground during the tire rolling and, respectively, those parts of the grooves which are stressed after a predetermined angular rotation of the wheel.

In the same way, in the following description and in the appended claims, the terms: "upwards" and "downwards" are intended to indicate—with reference to the position of the grooves—parts of the tread band, for instance the rubber blocks, that are stressed or get in touch with the ground during the tire rolling before and, respectively, after said grooves.

In the following description and in the appended claims, furthermore, all the angular values measured starting from a plane ($\pi$) tangent to the groove bottom will be measured in counterclockwise direction.

According to the invention, when the value of angle a formed by the inlet wall of the grooves is within the range of values mentioned hereinabove, it has been noticed a rigidity increase of the rubber blocks positioned upwards of the grooves in the very zone of the tread band subject to greater stresses during the straightaway running—the equatorial zone—with a substantial disappearance of the aforementioned chunking phenomenon.

Advantageously, it has also been found:

a) an increased wear resistance of the tire tread, with the ensuing advantageous possibility of reducing the tire weight, and consequently of reducing both the disturbing effects on vehicle stability caused by impacts or ground roughness and the braking distance because of the lower inertia of the tire;

b) a greater wear uniformity of the tire tread, with an ensuing advantageous road holding increase of the same;

c) a lower rolling resistance of the tire, with an ensuing wear reduction.

Preferably, angle ($\alpha$) has a value of from 60° to 70° and still more preferably, it is equal to about 65°: in fact, an optimum rigidity of the rubber blocks positioned upstream of the grooves has been found within such range of values, while under 60° the tire has shown an undesired progressive loss of traction capacity, a wear increase and a rolling unevenness.

Preferably, the equatorial zone of the tread band interested by the desired inclination of the inlet walls of the grooves extends on either side of the equatorial plane of the tire for a portion having a width of from 10% to 35% of the axial development of said tread band.

Still more preferably, such equatorial zone extends on either side of the equatorial plane of the tire for a portion having a width of from 25% to 30% of the axial development of the tread band, being understood that the term: axial development, indicates the width of the tread band measured along the peripheral surface of the tire.

Preferably, the inclination of the inlet walls of the grooves, i.e. the value of angle ($\alpha$), is substantially constant within the equatorial zone of the tread band, as specified hereinabove.

It has in fact been found that such feature contributes to achieve the rigidity of the rubber blocks necessary to obtain the substantial disappearance of the aforesaid chunking phenomenon in the very tread zone more stressed during the straight running of the motor-vehicle.

In order to obtain the desired greater mobility of the rubber blocks in correspondence of the opposite side portions of the tread band external to said equatorial zone, the value of angle ($\alpha$) linearly increases as one moves away from the equatorial plane (X-X), and according to the chord of the tire, up to a maximum value of from 80° to 90°, which value is reached near opposite end portions of the tread band.

In other words, the inclination of the grooves inlet walls progressively increases with respect to plane ($\pi$) tangent to their bottom, until it reaches—only and solely in correspondence of opposite end portions of the tread band—the configuration of "substantial perpendicularity" shown by the grooves formed in the tires of the known art along the whole axial development of the tread band.

Since the length of the grooves, according to the special tread pattern one wants to realize, may also be shorter than the whole axial development of the tread band, it ensues that the inclination of the inlet wall of the grooves takes a predetermined value, in accordance with the variation rule defined hereinabove, depending on its position (equatorial zone rather than side zones) on said tread band.

This means that the aforementioned variation in the inclination of the grooves inlet walls from 50° to 90° will take place only for those grooves having such a length as to span along the whole axial development of the tread band, while for those grooves positioned only in the side zones of the tread band and having such a length as to be outside of the equatorial zone, the inclination variation of the inlet walls may be limited to a range from, for instance, a minimum of 65° to a maximum of 85° as one moves away from the tire equatorial plane.

According to a preferred feature of the invention, furthermore, in the equatorial zone of the tread band the outlet wall of the grooves is inclined with respect to their bottom in a direction opposite to the rolling direction of the tire, and forms, with respect to a plane ($\pi$) tangent to said bottom, an angle ($\alpha'$) of from 90° to 100°.

In other words, the outlet walls of the grooves show in the equatorial zone of the tread band a configuration of "substantial perpendicularity" which impart to the rubber blocks positioned downstream of the grooves the mobility necessary to ensure an adequate road holding.

In the same way as has been illustrated hereinabove with reference to angle ($\alpha$) formed by the inlet wall of the grooves, angle ($\alpha'$) as well is preferably substantially constant along the equatorial zone of the tread band.

In accordance with a further preferred feature of the invention, in the opposite side zones of the tread band external to said equatorial zone, angle ($\alpha'$) formed by the outlet wall of the grooves linearly increases as a function the tire chord as one moves away from the equatorial plane (X-X), up to a maximum value of from 100° to 130° reached near opposite end portions of the tread band.

Preferably, the maximum value of said angle ($\alpha'$) is between 110° and 120° and, still more preferably, it is equal to about 115°.

In other words, the outlet walls of the grooves reduce progressively their inclination with respect to plane ($\pi$) tangent to their bottom and in opposite direction with respect to the tire rolling direction, until they reach, in opposite side zones of the tread band, a configuration "symmetrical" to the configuration of the grooves positioned in the equatorial zone of the tread band.

In this way, it has been found that the rubber blocks positioned downstream of the grooves possess in the side zones of the tread band an optimum rigidity, which coupled with the mobility of the upstream-positioned rubber blocks—causes both an adequate road holding and an advantageous more uniform wear of the tire.

In a preferred embodiment of the present invention, the grooves extend transversally along the tread band according to a curvilinear path substantially parallel to the wear waves (otherwise known as "Schalamack waves" after the name of the researcher who has theorized the phenomenon) of the tread band.

Such a conformation of the grooves, in fact, advantageously allows to reduce the wear of the tread band and contributes to reduce the tire noise during running of the vehicle.

Preferably, just to better follow the aforesaid wear waves, the grooves have at least a curvature center positioned upstream of the same in the opposite side zones of the tread band, external to the aforesaid equatorial zone.

In such side zones, the grooves preferably have a curvature radius of from 160 to 240 mm.

Preferably, the tire of the present invention comprises at least a groove substantially extending throughout the whole axial development of the tread band according to a substantially double-inflection curvilinear path, including opposite side portions having their respective curvature centres positioned upstream of the groove and on opposite sides with respect to said equatorial plane of the tire.

Also in this case, the opposite lateral portions of such a groove preferably have a curvature radius of from 160 to 240 mm.

Preferably, at least one of the lateral portions of such double-inflection path groove axially extends along the tread band between the equatorial plane of the tire and the end of one of the side zones of the tread band.

In a preferred embodiment of the present invention, the lateral portions of the groove having a double-inflection path are connected through an intermediate portion having a curvature center positioned downstream of said groove.

Preferably, such intermediate connecting portion axially extends along the tread band in at least part of the equatorial zone of the tire and has a curvature radius of from 70 to 90 mm.

According to this embodiment of the invention, the grooves having a double-inflection path act as connecting elements between grooves formed in opposite parts of the tread band and shaped according to the wear waves.

Advantageously, the double-inflection grooves, not only optimize the wear of the tread band in terms of uniformity and reduction of wear velocity, but also contribute to a still more effective evacuation of the water present under the tire ground-contacting area.

In a preferred embodiment of the present invention, the belt structure of the tire comprises at least a radially external layer including a plurality of circumferential cord coils, axially arranged side by side, of a cord wound with a substantially zero angle with respect to the equatorial plane of the tire (zero-degree cord).

Advantageously, the adoption of such a belt structure allows to increase both the flexibility of the belt structure and the tire ground-contacting area, i.e., the area where the tire touches the ground, in all of the use conditions of the tire.

Thanks to this feature, both the stresses due to sliding on the road and the stresses due to hysteresis dissipation in the rubber composition of the tread band are reduced, with an advantageous increase in wear resistance of the tire.

This advantageous feature, furthermore, allows in its turn to reduce the so-called "solid area", i.e. the area occupied by the rubber blocks in a portion of the tread band having a length equal to the pitch of the tread pattern and a width equal to the axial development of the tread band.

In the following description and in the appended claims, the term: pitch of the tread pattern, indicates the length, measured along the circumferential development of the tread band, of a tread pattern portion which is periodically repeated for a whole number "n" of times over the circumferential development of the tread band.

In the present case, therefore, the pitch of the tread pattern is equal to the distance between the starting points of two subsequent repetitive portions of the tread pattern, measured along the circumferential development of the tread band.

The reduction of the solid area obtained according to this embodiment of the invention, allows to achieve the following additional advantages:

a) an improvement of wear resistance and, along therewith, of the kilometric yield of the tread band;
b) an improvement of the tire capacity of draining off the water present under the ground-contacting area (aquaplaning);
c) an improvement of braking behaviour of the tire, with a reduction in the braking distance of the vehicle;
d) an improvement of road holding both on dry road (dry grip) and on wet road (wet grip).

Preferably, in this embodiment of the tire the solid area is between 75% and 90% and still more preferably between 80% and 85% of the total area of said portion having a length equal to the pitch of the tread band pattern and a width equal to the axial development of the tread band.

Preferably, the aforesaid radially external layer including zero-degree cords of the tire belt structure is suitably formed by a single cord or a strip of rubberized fabric comprising some metal cords of the high-elongation type, preferably 1 to 5 cords, wound up spiral-wise on the carcass structure from one end to the other of the central crown portion of the same.

Preferably, furthermore, the cord coils arranged at a substantially zero-degree angle with respect to the equatorial plane of the tire are distributed with variable density along the axial development of the belt structure.

According to this embodiment of the invention, the distribution density of the cord coils changes progressively along the belt structure, preferably progressively increasing from the equatorial plane towards the ends of the belt structure according to a predetermined relation.

Advantageously, this feature allows to obtain both a differentiated stiffness in the axial direction and a more uniform stress of the tire belt structure in use.

In accordance with the experiments of the Applicant, such relation may conveniently have the following expression:

$$Nx = K \frac{R^2}{r^2} No$$

wherein:

No is the number of cord coils arranged in a central portion of unitary length located on either side the equatorial plane;

R is the distance between the center of said portion and the rotation axis of the tire;

r is the distance between the center of the unitary portion between the equatorial plane and the axial ends of said radially external layer and the rotation axis of the tire; and K is a parameter that takes into account the constituent material and the cord formation, as well as the amount of rubber around the cord and the weight of the radially-internal layer portion at said unitary portion, which is variable with variations in the material type and structural features of the belt strips along the crown profile that diverge from a reference value.

This parameter K may take a value substantially close to 1 if the cords have the same formation and all the connected materials are the same throughout the layers, or different values according to variations in the materials and formation of the reinforcing elements along the peripheral extension of the belt structure.

A distribution of the cords in accordance with such relation ensures both the uniformity of the stress affecting the belt structure during use of the tire, as a consequence of the centrifugal force applied, and the necessary differentiated stiffness along the axial direction.

Clearly, those skilled in the art may find other relations which, according to the aforementioned design variables, would allow to achieve at the same time a differentiated stiffness along the axial direction and a stress uniformity in the belt structure of the running tire, by varying in a controlled manner the density of the above cords.

Preferably, the winding density of the cords at zero-degree in the area located on either side of the equatorial plane, where the maximum thinning out takes place, is not greater than 8 and more preferably is between 3 and 6 cords/cm.

The axial width of said zone varies preferably from 10% to 30% of the axial development of the belt.

Preferably, the quantity of cords in said central area is equal to a value between 60% and 80% of the quantity of cords near the tire shoulders, where the density of said cords is preferably not greater than 10 and more preferably included between 6 and 8 cords/cm.

Preferably, the cord coils comprise high elongation metal cords, obtained from high carbon content steel wires.

Alternatively, cords the cord coils comprise aramid textile cords.

Preferably, the cord coils of the aforesaid radially external layer are wound on a supporting auxiliary element located in a radially internal position, which element, in a preferred embodiment, is a sheet of elastomeric material placed between said cord coils and the carcass ply, optionally charged with binding agents dispersed in said material.

For the purposes of the invention, said binding agents may be reinforcing fibrous fillers of a material selected from the group comprising: textile, metal, glass fibers or short fibrillated aramid fibers.

Preferably, said reinforcing fibrous fillers are oriented along a preferential direction, parallel or inclined with respect to the equatorial plane of the tire.

Still more preferably, the reinforcing fibrous fillers are short fibers formed with fibrils of aramid homogeneously distributed in the sheet of elastomeric material in a quantity of from 1 and 10 phr (parts by weight per 100 parts by weight of elastomer).

Alternatively, according to further embodiments of the invention, said supporting auxiliary element may comprise two strips axially arranged side by side, provided with reinforcing elements oriented according to inclined directions in each strip and opposite to one another in the two strips with respect to the equatorial plane of the tire, or two radially superposed strips located on each side of the equatorial plane, provided with reinforcing elements oriented according to directions inclined in each strip and opposite to one another in the two strips with regard to the equatorial plane of the tire.

In this case, the reinforcing elements of said radially internal layer may be selected from the group comprising textile cords and metal cords; besides, the reinforcing elements in one of said strips may be formed by a material different from that of the reinforcing elements of the adjacent strip in radial direction.

In a further embodiment of the invention, it has been found that by using ararnid fibers in the carcass bead wires, a tire structure having an improved beads flexibility, which makes easier the mounting operations of the tire onto a wheel rim, may be obtained.

Further characteristics and advantages will be more readily apparent by the following description of a preferred embodiment of a tire according to the invention, provided by way of non limitative indication hereinbelow with reference to the attached drawings.

BRIEF DESCRIPTION OF THE DRAWINGS

FIGS. 3 and 4 show respective cross-sections of a groove, taken in different positions along the axial development of the tread band, along lines A—A' and B—B' of FIG. 2;

FIG. 5 shows a diagram of the preferred variation rule of angles $\alpha$ and $\alpha'$, formed by the inlet and outlet walls of the grooves as a function of the distance from the equatorial plane measured along the chord of the tire of FIG. 1;

FIGS. 6a–6c show respective enlarged scale cross-sections of a groove of the tire of FIG. 1, taken at the equatorial plane and opposite end portions of the tread band of the tire of FIG. 1.

DETAILED DESCRIPTION OF THE PREFERRED EMBODIMENTS

Figure 1:
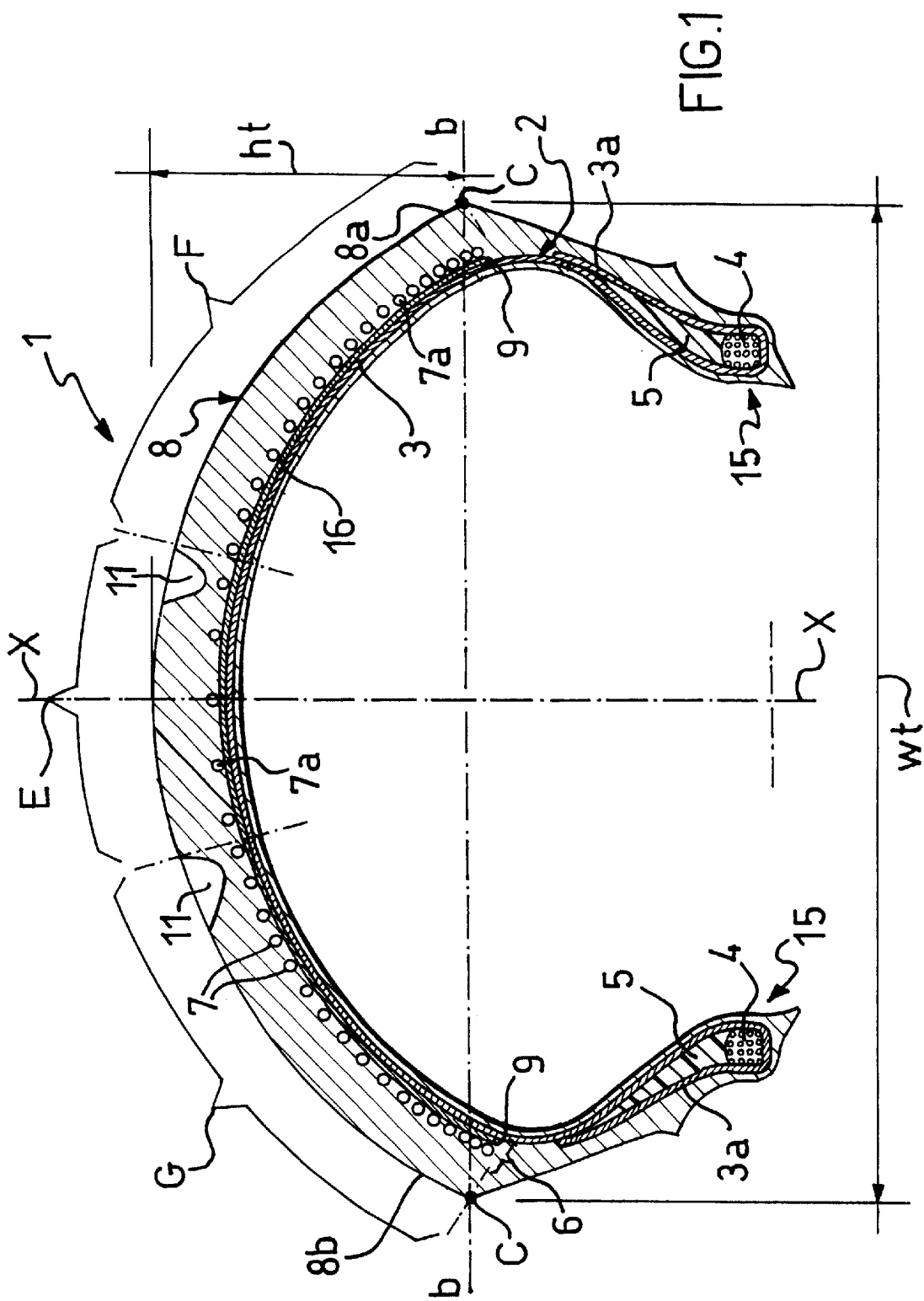
FIG. 1 shows a cross-section view of a tire according to the invention, taken along line I—I of FIG. 2.

With reference to FIG. 1, numeral indicates a high-transverse-curvature tire intended for two-wheeled vehicles, in particular to be mounted on the rear wheel of a motor-vehicle.

As is known, the transverse curvature of a tire is defined by the specific value of the ratio between the distance ht of the tread crown from the line b—b passing through ends C of the tread band, measured on the equatorial plane X-X, and the distance wt measured along the tire chord between said ends, said transverse curvature having in two-wheeled vehicles a relatively high value, usually not lower than about 0.15 in case of tires mounted on the rear wheel and even higher in case of tires for the front wheel, against a value usually lower than 0.05 in tires for motor-cars.

If the tread ends cannot be easily identified, for instance due to lack of a precise reference such as the corner indicated by C in FIG. 1, the value of the tire maximum chord may be assumed as distance wt.

The value of the aforesaid transverse curvature is called "curvature ratio".

In the tire of the invention such value is preferably between 0.15 and 0.30.

Tire 1 comprises a carcass structure 2 having a central crown portion 16 comprising at least a carcass ply 3 defining two sidewalls whose side edges 3a are turned around the respective bead cores 4.

On the external peripheral edge of bead cores 4 an elastomeric filling 5 is applied which fills the space defined between the carcass ply 3 and the corresponding folded-back side edge 3a of the carcass ply 3.

As is known, the tire zone comprising the bead core 4 and the filling 5 forms the so-called bead, globally indicated by 15, intended for anchoring the tire onto a corresponding mounting rim, not shown.

A belt structure 6, which comprises at least one radially external layer including one or several cords 7, consecutively arranged in parallel and located side by side on the central crown portion 16 from one end to the other of the carcass structure 2, is coaxially associated to said carcass structure 2.

According to such an arrangement, cords 7 form a plurality of circumferential cord coils 7a, substantially oriented according to the rolling direction of the tire, which direction is usually called "at zero degree", with reference to its position with respect to the equatorial plane X-X of the tire.

Preferably, the belt structure 6 is constituted by a single cord or a strip of rubberized fabric comprising cords arranged side by side, preferably up to five, spiraled from one end to the other on said crown portion 16 of the carcass ply 2.

Still more preferably, such cord is the well-known metal cord of the high elongation type (HE) whose use and characteristics have already been widely disclosed for instance in European Patent EP 0 461 646 of the same Applicant, to which reference is made for more details.

In short, said cords consist of a certain number of strands, from 1 to 5, preferably between 3 and 4, each strand consisting of a certain number of individual wires, from 2 to 10, preferably between 4 and 7, having a diameter greater than 0.10 mm and preferably of from 0.12 to 0.35 mm. The wires in the strands and the strands in the cord are helically wound together in the same direction, with winding pitches equal or also different for the wires and the strands.

Preferably, such cords are made of high-carbon (HT) steel wires, i.e. steel wires with a carbon content higher than 0.9%. In particular, in a specific prototype prepared by the Applicant, the helical winding of the layer of circumferential cord coils 7a consists of a single cord 7, known as 3×4×0.20 HE HT, spiraled from one end of the belt to the other. The above description defines a metal cord formed of three strands each consisting of four elementary wires wound in the same direction as the strands and having a diameter of 0.20 mm; as is known, the abbreviation HE means "high elongation" and the abbreviation HT means "high tensile" steel, i.e. high carbon content steel.

Such cords have an ultimate elongation of from 4% to 8%, and a typical behavior to tensile stress, the well known and so called "spring behavior", which is particularly useful for the conformation and shaping of these high-transverse-curvature tires.

Clearly, the preferred use of metal wires does not exclude the use of other cords, in particular and with suitable measures, the use of the likewise known textile cords made of aramidic fiber, as well as a combination thereof: solely by way of example, a zero-degree cord layer might be devised comprising textile cords (of aramid) in central position and metal cords (HE) in the adjoining side portions, and vice-versa. As regards the different winding techniques of the cords around the carcass, these too are well known and therefore they are not illustrated herein.

According to a further advantageous embodiment of the belt structure 6, shown in FIG. 1, the coils 7a of cord 7, arranged at a substantially zero angle with respect to the equatorial plane X-X of the tire, are distributed with variable density along the axial development of the belt structure 6.

In this case, the distribution density of cord coils progressively changes along the layer, from the equatorial plane towards the ends, preferably according to the following relation:

$$Nx = K \frac{R^2}{r^2} No$$

wherein:

No is the number of cord coils arranged in a central portion of unitary length located on either side of the equatorial plane;

R is the distance between the center of said portion and the rotation axis of the tire;

r is the distance between the center of the unitary portion between the equatorial plane and the axial ends of said radially external layer and the rotation axis of the tire; and K is a parameter that takes into account the constituent material and the cord formation, as well as the amount of rubber around the cord and the weight of the radially-internal layer portion at said unitary portion, which is variable with variations in the material type and structural features of the belt strips along the crown profile that diverge from a reference value.

Preferably, the density of the zero-degree cords in the zone on either side of the equatorial plane X-X of tire 1 is between 3 and 6 cords/cm, while near the ends of belt structure 6 is between 6 and 8cords/cm.

Preferably, the belt structure 6 further comprises an auxiliary supporting element 9, substantially consisting of a sheet of elastomeric material interposed between cord layer and the carcass ply 3 and on which the cord coils 7a formed by cord 7 are wound (FIG. 1).

Such auxiliary supporting element 9 performs several useful functions. First of all, thanks to its adhesiveness and structural resistance, it keeps adequately connected to one another the cord coils 7a formed by cord 7 during the preparation steps of the belt, imparting to the belt 6 a sufficient structural stability during its manufacture and during the subsequent handling stages that precede the assembly of said structure with the carcass 2. Upon completion of the vulcanization, the presence in the running tire of the auxiliary element 9 provides further advantages in terms of improved behavior characteristics of the tire, in particular by increasing its slip thrust capacity. On the other hand, the auxiliary supporting element 9 should be as thin as possible, to adequately limit its weight which, being within the maximum radius zones of the tire, is of great importance with reference to the generation of centrifugal forces.

In order to allow the manufacture and use of auxiliary supporting elements 9 with suitably reduced thicknesses, the rubber composition forming said auxiliary supporting elements (preferably a natural rubber-based composition containing carbon black in a quantity of from 30 to 70 phr) should preferably contain a homogeneously dispersed reinforcing filler.

Preferably, said dispersed reinforcing filler is composed of coupling agents, suitable to increase the characteristics of mechanical resistance and drawing-out of the material in the crude state, substantially altering the adhesiveness characteristics thereof.

In this regard, use of the so-called aramid pulp (short fibrils of poly-paraphenylen-terephtalamide), of the type known in the trade by "Kevlar®-pulp" or "Twaron®-pulp" (Kevlar® and Twaron® are registered Trademarks of DuPont and Akzo, respectively), is preferred.

The elastomeric material reinforced with said aramid pulp has, in the crude state, an ultimate tensile stress load of from 3 to 7 MPa, with a 50% elongation at a tensile load of from 0.6 to 3 MPa.

It has so been found that, in the presence of aramidic fibers dispersed in the composition of the elastomeric material that makes it up, the auxiliary supporting element 9 may take the form of an extremely thin sheet able to withstand at the same time those permanent deformations and stresses induced in the same during the manufacture of the crude tire.

More particularly, it has been found that the best results are those obtained by incorporating 0the aramid pulp in the composition of the crude elastomer in a quantity of from 1 to 10 phr (parts by weight per 100 parts of rubber) and using fibers of a length of from 0.1 to 2.5 mm. In practice, it is possible to make and use, in the tire manufacture, an auxiliary supporting element 9 of a thickness of from 0.075 to 0.5 mm, preferably of about 0.25 mm or less.

The resistance to the different stresses may be further increased by shaping the auxiliary element 9 through calendering, so that the aramid fibers may be pre-oriented according to a preferred direction in the elastomer sheet that forms the auxiliary element: such preferred direction may be, at least for use in the tire according to the invention, the transverse direction of the tire, even though excellent results are obtained also with the longitudinal direction.

A tread band 8, by means of which the tire 1 gets in touch with the ground, is applied in a known manner onto the belt structure 6 described hereinabove.

Figure 2:
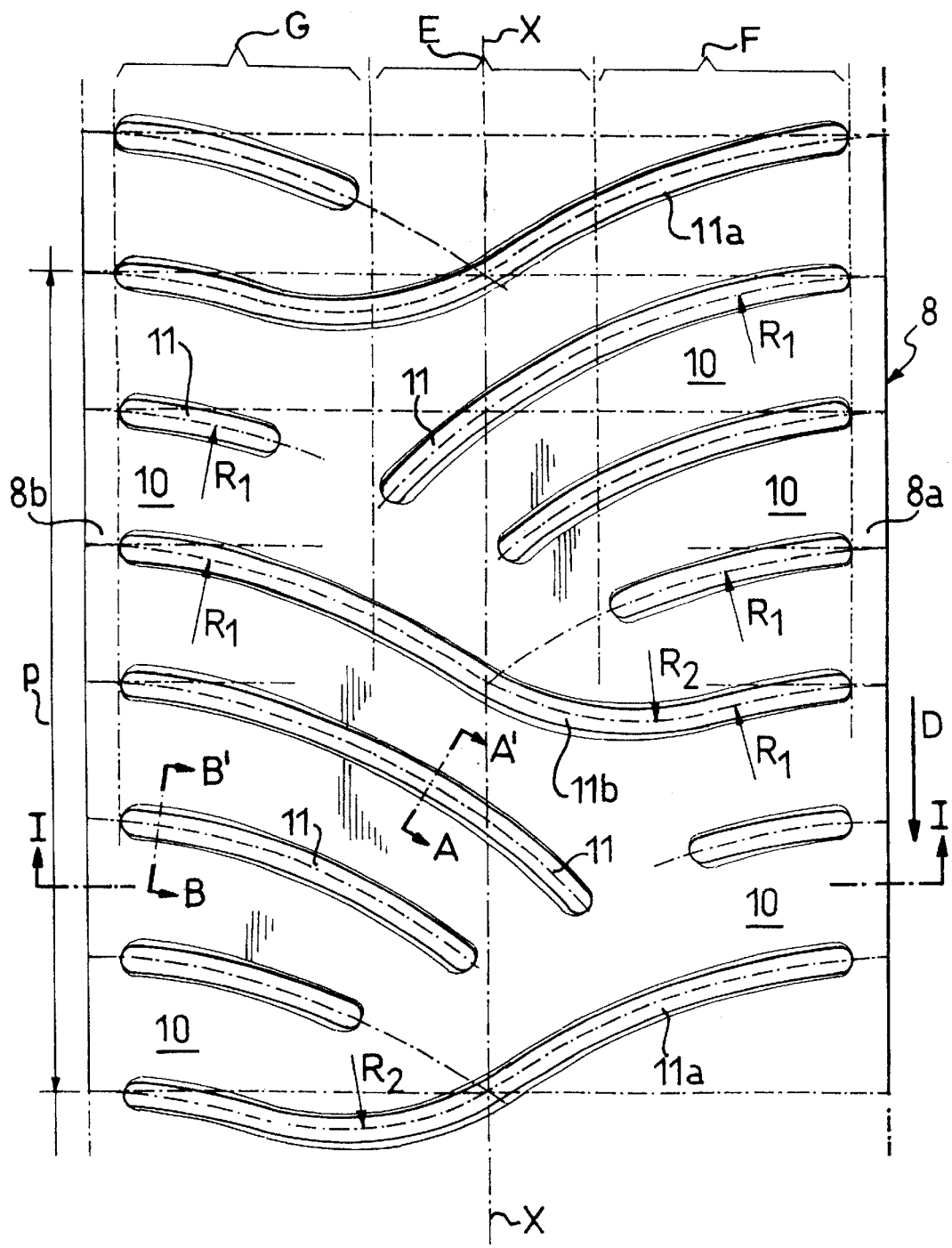
FIG. 2 shows a plan development of a tread portion of a tire according to the invention.

The tread band 8 comprises a plurality of rubber blocks, all indicated by reference 10, defined between a plurality of grooves 11 extending in a direction substantially transverse to the running direction of the tire, indicated by arrow D in FIG. 2, tire tread band 8 being free from any groove extending along a direction substantially parallel to the running direction D of the tire.

For the sake of convenience, the term: rubber block, is used in this description to indicate an elongated portion of the tread band 8 extending in a prevailing axial direction and between two subsequent grooves 11.

Each of said grooves 11 comprises in its turn a bottom 12 connected to opposite inlet 13 and outlet 14 walls, having a predetermined inclination with respect to the bottom 12 according to the position considered along the axial development of the tread band 8.

More particularly, according to the invention, the inclination of the inlet and outlet lateral walls 13, 14 of grooves 11 has a constant and predetermined value in an equatorial zone of tread band 8 indicated by E in FIGS. 1 and 2.

Preferably, such equatorial zone E of the tread band 8 extends on either side of the equatorial plane X-X of tire 1 for a width of from 10% to 35% of the axial development of said tread band.

Still more preferably, the equatorial zone E extends on either side of the equatorial plane X-X of the tire for a length of from 25% to 30% of the axial development of the tread band 8.

In the equatorial zone E, the inlet wall 13 of grooves 11 is inclined towards the rolling direction of the tire and forms, with respect to a plane π tangent to bottom 12, an angle α varying from 50° to 80° (FIG. 3).

As described hereinabove and illustrated in FIGS. 3 and 4, the angular values defining the inclination of inlet and outlet lateral walls 13, 14 of grooves 11 measured starting from the above plane (π) tangent to the bottom 12 of said grooves will be all measured in counterclockwise direction.

In accordance with a preferred embodiment illustrated in FIG. 3, the inlet wall 13 of grooves 11 forms, with respect to plane π, an angle α equal to about 65°.

In other words, the inlet wall 13 of grooves 11 forms, with respect to a plane perpendicular to the bottom 12, an angle equal to about 25°.

In the equatorial zone E of tread band 8, the outlet wall 14 of grooves 11 is instead inclined towards a direction opposite to the rolling direction of the tire (i.e. towards the left with reference to FIG. 3) and forms, with respect to plane π, an angle α' of from 90° to 100°.

According to a preferred embodiment shown in FIG. 3, the outlet wall 14 of grooves 11 forms, with respect to plane π, an angle α' equal to about 95°.

In other words, the outlet wall 14 of grooves 11 forms, with respect to a plane perpendicular to bottom 12, an angle equal to about 5° measured in the direction opposite to the rolling direction of the tire.

According to the invention, in opposite side zones F, G of the tread band 8, external to said equatorial zone E, the inclination of the inlet and outlet side walls 13, 14 of the grooves 11 linearly changes—according to the chord of tire 1—as one moves away from the equatorial plane X-X, approaching opposite end portions 8a, 8b of the tread band 8.

More particularly, angle α formed by the inlet wall 13 of grooves 11 with respect to plane πtangent to bottom 12 linearly increases according to the chord and reaches a value of from 80° to 90° at the end portions 8a, 8b of the tread band 8 (see FIG. 4).

In other words, in the opposite side zones F, G of the tread band 8, the inclination with respect to plane π of the inlet wall 13 of grooves 11 linearly increases until it reaches the maximum inclination in the aforesaid end portions 8a, 8b.

Preferably, in the end portions 8a, 8b, the inlet wall 13 of grooves 11 forms, with respect to plane π, an angle equal to 85°, i.e. it forms, with respect to a plane perpendicular to bottom 12, an angle α equal to about 5° (FIG. 4).

The preferred variation rule of angle α as a function of the distance from the equatorial plane X-X of tire 1 measured along the chord of the same, is graphically shown in FIG. 5.

Clearly, only those grooves 11 spanning along the whole axial development of the tread band 8 will be concerned by an inclination variation of inlet walls 13 within the whole range of values as defined hereinabove, while for those grooves 11 positioned in side zone F, G of the tread band 8 and whose length does not touch upon the equatorial zone E, the variation of angle α may be limited to an interval ranging from a maximum value of 90° and a minimum value of 65° as one approaches the equatorial plane X-X.

According to the invention, angle α' as well—formed by outlet wall 14 of the grooves 11 with respect to plane π tangent to bottom 12—linearly increases according to the chord of the tire in the side zones F, G of the tread band 8 and reaches a value of from 100° to 130° in the end portions 8a, 8b of tread band 8 (FIG. 4).

In other words and as can be easily seen in FIGS. 3 and 4, in the side zones F, G of the tread band 8, the inclination of outlet wall 14 of the grooves 11 linearly decreases with respect to plane π and in a direction opposite to the rolling direction of the tire, as one moves away from the equatorial plane X-X until the minimum inclination is reached in said end portions 8a, 8b.

Preferably, in the end portions 8a, 8b, the outlet wall 14 of grooves 11 forms with respect to plane π, an angle α' equal to 115°, i.e. forms an angle equal to about 25° with respect to a plane perpendicular to the bottom 12.

In this case too, only those grooves 11 spanning along the whole axial development of the tread band 8 will be 20 concerned by an inclination variation of the outlet walls 14 within the whole range of values defined hereinabove, while for those grooves 11 positioned in the lateral zones F, G of the tread band 8 and having a length that does not touch upon the equatorial zone E, the variation of angle α' may be limited within an interval ranging from 130° to 100° as one approaches the equatorial plane X-X.

The preferred variation rule of angle α' as a function of the distance from the equatorial plane X-X of tire 1 measured along the chord of the same, is graphically shown in FIG. 5.

FIGS. 6A–6C show as many cross-sections of the grooves 11 in the equatorial zone E of tire 1 and, respectively, in the end portions 8a, 8b of the tread band 8.

In a preferred embodiment of tire 1, the grooves 11 transversely extend along the tread band 8 according to a curvilinear path substantially parallel to the so-called wear waves (also known by the term "Schlamack waves") of said tread band.

To this aim, the grooves 11 have at least a curvature center positioned upstream thereof in the opposite side zones F, G of the tread band 8, which zones are external to the equatorial zone E defined hereinabove.

In such side zones F, G the grooves 11 have a curvature radius $R_1$ ranging from 160 to 240 mm, preferably between 180 to 200 mm, and still more preferably equal to about 190 mm.

Preferably, in a portion of the tread band 8 having a length equal to the pitch of the tread pattern, the tire 1 of the present invention comprises at least one groove, preferably a couple of grooves 11a, 11b, extending substantially throughout the whole axial development of the tread band 8 according to a curvilinear, substantially double-inflected path.

Each of said grooves 11a, 11b includes opposite lateral portions whose respective curvature centers are positioned upstream of them and on opposite sides with respect to the equatorial plane X-X of tire 1 (FIG. 2).

In this case too, the opposite lateral portions of the grooves 11a, 11b having a double-inflection path—lying in the opposite side zones F, G of the tread band 8 preferably have a curvature radius of from 160 to 240 mm and preferably equal to about 190 mm.

Besides, according to a further preferred embodiment of the invention, at least one of the lateral portions of the grooves 11a, 11b having a double-inflection path transversely extends along the tread band 8 between the equatorial plane of tire 1 and the end of one of the side zones F, G of said tread band.

More precisely, in the present example groove 11a comprises a lateral portion extending between the equatorial plane X-X and the end of the side zone F, while groove 11b comprises a lateral portion extending between the equatorial plane X-X and the end of the opposite side zone G.

Preferably, the opposite lateral portions of grooves 11a, 11b are connected through an intermediate portion, transversely extending along the tread band 8 in at least part of the equatorial zone E, the curvature center of which is positioned downstream of said groove.

More precisely, in the present example the intermediate portion of groove 11a extends between the equatorial plane X-X and a part of the side zone G, while the intermediate portion of groove 11b extends between the equatorial plane X-X and a part of the opposite side zone F.

Preferably, such intermediate connecting portion has a curvature radius $R_2$ of from 70 to 90 mm and still more preferably equal to about 80 mm.

When, as in the case illustrated in the figures, the belt structure 6 comprises a plurality of cord coils 7a made of zero-degree cord, the tire 1 of the invention has—in a portion of tread band 8 whose length is equal to pitch "p" of the tread pattern and whose width is equal to the axial development of tread band 8—a so-called "solid area" suitably reduced with respect to the tires of the known art.

Preferably, the so-called "solid area" ranges from 75% to 90% and still more preferably between 80% and 85% of the total area of said portion.

Repeated tests carried out by the Applicant have shown that the tires according to the invention, besides solving the problem of reducing and possibly eliminating the "chunking" phenomenon, also achieve many advantages with respect to the tires of the known art.

Among them, the following may be mentioned:

a) an improved wear resistance of the tire tread, with the ensuing advantageous possibility of reducing the tire weight, and along therewith, reducing the disturbing effect on vehicle trim caused by impacts or ground roughness, and reducing the braking distance because of the lower inertia of the tire;

b) a greater wear uniformity of the tire tread, with ensuing advantageous increase in road holding of the same;

c) an increase in the kilometric yield of the tire;

d) a greater thermal stability of the rubber blocks formed on the tread band;

e) a lower rolling resistance of the tire, with ensuing wear reduction;

f) an improved capacity of the tire of draining off the water present under the ground-contacting area;

g) an improved road holding both on dry road (dry grip) and on wet road (wet grip).

Obviously, those skilled in the art may introduce variants and modifications to the above described invention, in order to satisfy specific and contingent requirements, which variants and modifications fall anyhow within the scope of protection as is defined by the appended claims.

What is claimed is:

1. A tire for two-wheeled vehicles comprising:

a carcass structure (2) of toric form having a high transverse curvature and provided with a central crown portion (16) and two sidewalls ending in a couple of beads (15) for anchoring onto a corresponding mounting rim;

a belt structure (6), circumferentially inextensible, coaxially extended around the carcass structure (2);

a tread band (8) coaxially extended around the belt structure (6) and comprising a plurality of rubber blocks (10) defined between a plurality of grooves (11) extending along a direction substantially transverse to the running direction of the tire, said tread band (8) being free from any groove extending along a direction substantially parallel to the running direction of the tire, said grooves (11) comprising a bottom (12) connected to opposite inlet (13) and outlet (14) lateral walls extending substantially perpendicular to said bottom (12) such that said lateral walls (13, 14) form with respect to a plane perpendicular to said bottom (12) an angle varying from 0° to 40°;

wherein in an equatorial zone (E) of the tread band (8) the inlet wall (13) of said grooves (11) is inclined with respect to said bottom (12) towards the rolling direction of the tire and forms with respect to a plane ($\pi$) tangent to said bottom (12) an angle $\alpha$ of from 50° to 80°.

2. A tire according to claim 1, wherein said angle ($\alpha$) is between 60° and 70°.

3. A tire according to claim 1, wherein said equatorial zone (E) extends on either side of the equatorial plane (X-X) of the tire for a portion having a width of from 10% to 35% of the axial development of said tread band (8).

4. A tire according to claim 1, wherein said angle ($\alpha$) is substantially constant within said equatorial zone (E) of the tread band (8).

5. A tire according to claim 1, wherein in opposite side zones (F, G) of the tread band (8), external to said equatorial zone (E), said angle ($\alpha$) linearly increases according to the chord of the tire up to a maximum value of from 80° to 90°.

6. A tire according to claim 1, wherein in said equatorial zone (E) of the tread band (8) the outlet wall (14) of said grooves (11) is inclined with respect to said bottom (12) towards a direction opposite to the rolling direction of the tire and forms with respect to a plane ($\pi$) tangent to said bottom (12) an angle ($\alpha'$) of from 90° to 100°.

7. A tire according to claim 6, wherein said outlet wall angle ($\alpha'$) is substantially constant within said equatorial zone (E) of the tread band (8).

8. A tire according to claim 6, wherein in opposite side zones (F, G) of the tread band (8), external to said equatorial zone (E), said outlet wall angle ($\alpha'$) linearly increases according to the chord of the tire up to a maximum value of from 100° to 130°.

9. A tire according to claim 8, wherein the maximum value of said outlet wall angle (α') is between 110° and 120°.

10. A tire according to claim 1, wherein said grooves (11) transversely extend along the tread band (8) according to a curvilinear path substantially parallel to the wear waves of the tread band (8).

11. A tire according to claim 10, wherein in opposite side zones (F,G) of the tread band (8) external to said equatorial zone (E), said grooves (11) have at least a curvature center positioned upstream thereof.

12. A tire according to claim 11, wherein in said opposite side zones (FG) of the tread band (8) said grooves (11) have a curvature radius ($R_1$) of from 160 to 240 mm.

13. A tire according to claim 10, comprising at least one groove (11a, 11b) extending along substantially the whole axial development of the tread band (8) according to a substantially double-inflection curvilinear path, including opposite lateral portions whose respective curvature centers are positioned upstream of said at least one groove (11a, 11b) and on opposite sides with respect to the equatorial plane (X-X) of the tire.

14. A tire according to claim 13, wherein said opposite lateral portions have a curvature radius ($R_1$) of from 160 to 240 mm.

15. A tire according to claim 13, wherein at least one of said lateral portions of said at least one groove (11a, 11b) transversely extends along the tread band (8) between said equatorial plane (X-X) of the tire and an end of one of opposite side zones (F, G) of the tread band (8), external to said equatorial zone (E).

16. A tire according to claim 13, wherein the lateral portions of said at least one groove (11a, 11b) are connected through an intermediate portion having a curvature center positioned downstream of said groove (11a, 11b).

17. A tire according to claim 16, wherein said intermediate connecting portion transversely extends along the tread band (8) in at least part of said equatorial zone (E) of the tread band (8).

18. A tire according to claim 16, wherein said intermediate connecting portion has a curvature radius ($R_2$) of from 70 to 90 mm.

19. A tire according to claim 1, wherein said belt structure (6) comprises at least a radially external layer including a plurality of circumferential cord coils (7a), axially arranged side by side, of a cord (7) wound at a substantially zero angle with respect to the equatorial plane (X-X) of the tire.

20. A tire according to claim 19, wherein in a portion of the tread band (8) having a length equal to the pitch of the tread pattern and a width equal to the axial development of the tread band (8), the area occupied by said rubber blocks (10) is between 75% and 90% of the total area of said portion.

21. A tire according to claim 19, wherein said cord coils (7a), arranged at a substantially zero angle with respect to the equatorial plane (X-X) of the tire, are distributed with a variable density along the axial development of said belt structure (6).

22. A tire according to claim 21, wherein the density of said cord coils (7a) progressively increases from said equatorial plane (X-X) towards the ends of the belt structure (6).

23. A tire according to claim 22, wherein the density according to which said cord coils (7a) are distributed is given by the following relation:

$$Nx = K \frac{R^2}{r^2} No$$

wherein:
No is the number of cord coils (7a) arranged in a central portion of unitary width located on either side the equatorial plane (X-X);
R is the distance between the center of said portion and the rotation axis of the tire;
r is the distance between the center of the unitary portion between the equatorial plane and the axial ends of said radially external layer and the rotation axis of the axis of the tire;
K is a parameter that takes into account the constituent material and the cord formation, as well as the amount of rubber around the cord and the weight of the radially-internal layer portion at said unitary portion, which is variable with variations in the material type and structural features of the belt strips along the crown profile that diverge from a reference value.

24. A tire according to claim 23, wherein said density is not more than 10 cords/cm along the axial development of said belt structure (6).

25. A tire according to claim 19, wherein said belt structure (6) further comprises an auxiliary supporting element (9) in a radially internal position.

26. A tire according to claim 25, wherein said auxiliary supporting element (9) is a sheet of elastomeric material, interposed between the cord coils (7a) and the carcass structure (2), said sheet comprising binding agents dispersed in the elastomeric material thereof.

27. A tire according to claim 1, wherein, the plurality of rubber blocks comprises first rubber blocks loaded upstream of said grooves (11) in the equatorial zone (E), and second rubber blocks located in opposite portions (F, G) of the tire tread, wherein the mobility of the first rubber blocks is lower than the mobility of the second rubber blocks.

* * * * *